United States Patent Office 3,350,396
Patented Oct. 31, 1967

3,350,396
QUATERNARY AMMONIUM SALTS OF MORPHOLINOETHYL 3,4,5 - TRIMETHOXYBENZOATE
John D. McColl, Quebec, Quebec, Canada, and Gerassimos Frangatos, Princeton, N.J., assignors to Frank W. Horner Limited, Mount Royal, Quebec, Canada, a Canadian company
No Drawing. Filed June 9, 1964, Ser. No. 375,417
1 Claim. (Cl. 260—247.1)

This application is a continuation-in-part of application S.N. 97,859, filed Mar. 23, 1961, now abandoned.
This invention relates to novel quaternized salts of certain aminoalkyl esters of 3,4,5-trimethoxybenzoic acid. It also relates to novel pharmaceutical preparations containing such novel salts, which are effective as hypotensive agents and as inhibitors of acetylcholine synthesis.

The novel quaternized salts of aminoalkyl esters of 3,4,5-trimethoxybenzoic acid of the present invention are those having the general formula:

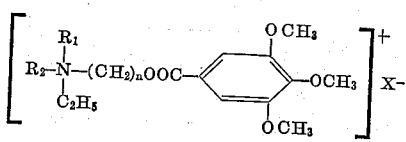

wherein $R_1$ and $R_2$ are so selected that $R_1$ and $R_2$ may be hydrocarbon radicals having 2–4 carbon atoms and may, when taken together with N, form an heterocyclic radical selected from the group consisting of pyrrolidino, piperidino and morpholino; $n$ is an integer selected from the group consisting of 2 and 3, and X is selected from the group consisting of chlorine, bromine, iodine and p-toluene sulfonate.

The quaternary salts of the present invention may suitably be prepared by reacting the basic esters of 3,4,5-trimethoxybenzoic acid with ethyl p-toluene sulfonate, ethyl bromide, ethyl iodide or ethyl chloride. The reaction may be run in any suitable solvent, for example, ether, benzene or excess quaternizing agent. It may also be run by heating equimolar quantities of the reactants together. The following examples are given to show the preparation of seven typical members of the novel group of quaternary salts of the present invention.

EXAMPLE I

*Ethiodide of diethylaminoethyl 3,4,5-trimethoxybenzoate*

To a solution of 10 g. of diethylaminoethyl 3,4,5-trimethoxybenzoate dissolved in 150 ml. of anhydrous ether, 10 ml. of ethyl iodide was added. The solution was allowed to stand at room temperature for 5 days with occasional shaking. The solvent was distilled and the residual oil was dissolved in 5 ml. of boiling isoamyl alcohol. After treating with charcoal and filtering, 75 ml. of ethyl acetate was added and 6.0 g. (40%) of the ethiodide of diethylaminoethyl 3,4,5-trimethoxybenzoate crystallized from the solution.
Melting point: 184° C.
Formula: $C_{18}H_{30}INO_5$.
Analysis.—Calculated: C, 46.26; H, 6.47; N, 2.99. Found: C, 46.01; H, 6.66; N, 2.81.

EXAMPLE II

*Ethiodide of diethylaminopropyl 3,4,5-trimethoxybenzoate*

A solution of 10 g. of diethylaminopropyl 3,4,5-trimethoxybenzoate and 10 ml. of ethyl iodide in 150 ml. of dry benzene was refluxed for 2 hours on the steam cone. After cooling, a solid precipitate was removed by filtration and the solvent was evaporated from the filtrate. The combined residues were dissolved in 5 ml. of isoamyl alcohol, treated with charcoal and filtered. Upon addition of 15 ml. of ethyl acetate immediate crystallization occurred. A second recrystallization yielded 6.5 g. (42.6%) of the ethiodide of diethylaminopropyl 3,4,5-trimethoxybenzoate.
Melting point: 188° C.
Formula: $C_{19}H_{30}INO_5$.
Analysis.—Calculated: C, 47.41; H, 6.70; N, 2.91. Found: C, 47.39; H, 6.63; N, 2.85.

EXAMPLE III

*Ethiodide of pyrrolidinoethyl 3,4,5-trimethoxybenzoate*

A solution of 10 g. of pyrrolidinoethyl 3,4,5-trimethoxybenzoate in 15 ml. of ethyl iodide was refluxed on the steam cone for 2 hours. The excess ethyl iodide was distilled and the residue was recrystallized twice from isoamyl alcohol-ethyl acetate as described in Example I and 6.7 g. (45%) of the ethiodide of pyrrolidinoethyl 3,4,5-trimethoxybenzoate was obtained.
Melting point: 162° C.
Formula: $C_{18}H_{28}INO_5$.
Analysis.—Calculated: C, 44.46; H, 6.06; N, 3.01. Found: C, 46.53; H, 6.21; N, 3.01.

EXAMPLE IV

*Ethyl bromide salt of pyrrolidinoethyl 3,4,5-trimethoxybenzoate*

A mixture of 61.8 g. (0.2 mole) of pyrrolidinoethyl 3,4,5-trimethoxybenzoate, 43.6 g. (0.4 mole) of ethyl bromide, and 60 ml. of benzene were placed in the Parr pressure reaction apparatus. The mixture was heated, with occasional shaking, at 125–130° C. for 4 hours. After adding 150 ml. of ethyl acetate to the cooled reaction mixture, it was filtered. The crude product was dissolved in isoamyl alcohol, treated with charcoal and filtered. Upon addition of ethyl acetate to the clear filtrate 72 g. (68%) of the quaternary bromide was obtained.
Melting point: 189° C.
Formula: $C_{18}H_{28}BrNO_5$.
Analysis.—Calculated: C, 51.68; H, 6.75; N, 3.35. Found: C, 51.58; H, 6.91; N, 3.86.

EXAMPLE V

*Ethyl bromide salt of diethylaminoethyl 3,4,5-trimethoxybenzoate*

A mixture of 62.2 g. (0.2 mole) of diethylaminoethyl 3,4,5-trimethoxybenzoate, 43.6 g. (0.4 mole) of ethyl bromide, and 60 ml. of benzene was placed in the Parr pressure reaction apparatus. The mixture was heated, with occasional shaking, at 130–140° C. for 5 hours. After adding ethyl acetate to the cooled reaction mixture, it was filtered. The crude product was dissolved in isoamyl alcohol, treated with charcoal and filtered. Upon addition of ethyl acetate to the clear filtrate, 70 g. (66%) of the quaternary bromide was obtained. This compound was hygroscopic and formed a monohydrate.
Melting point: 151° C.
Formula: $C_{18}H_{30}BrNO_5 \cdot H_2O$.
Analysis.—Calculated: C, 49.05; H, 7.41; N, 3.28. Found: C, 49.27; H, 7.37; N, 3.19.

EXAMPLE VI

*Ethyl p-toluene sulfonate of pyrrolidinoethyl 3,4,5-trimethoxybenzoate*

A mixture of 115.25 g. (0.5 mole) of 3,4,5-trimethoxybenzoyl chloride, 57.6 g. (0.5 mole) of pyrrolidinoethanol and 1200 ml. of benzene was refluxed and stirred mechanically for four hours. The reaction mixture, which gradually deposited a voluminous precipitate during the reflux period, was allowed to cool and then was treated with 300 ml. of 10% sodium hydroxide. The benzene layer was separated and the water layer was extracted twice with 100 ml. portions of benzene. The combined benzene layers were dried over sodium sulfate and decolorized with carbon. After removal of the benzene under reduced pressure, the residue was warmed to 145° C. to remove any unreacted pyrrolidinoethanol. Ethyl p-toluene sulfonate (100 g., 0.5 mole) was added and the mixture was stirred and heated at 140–145° C. for 3 hours. After allowing the mixture to cool, 200 ml. of isoamyl alcohol was added. The light brown solution was decolorized with carbon and 400 ml. of ethyl acetate was added. The quaternary salt precipitated promptly and 197.5 g. (77.6%) was obtained.

Melting point: 149° C.
Formula: $C_{25}H_{37}O_8NS$.
Analysis.—Calculated: C, 58.92; H, 6.92; N, 2.77. Found: C, 59.05; H, 6.91; N, 2.77.

EXAMPLE VII

*Ethyl p-toluene sulfonate of diethylaminoethyl 3,4,5-trimethoxybenzoate*

Starting with 0.5 mole of the reactants 3,4,5-trimethoxybenzoyl chloride, diethylaminoethanol and ethyl p-toluene sulfonate, and using the same procedure as above, a yield of 179 g. (69.7%) of the quaternary salt was obtained.

Melting point: 131° C.
Formula: $C_{25}H_{35}O_8NS$.
Analysis.—Calculated: C, 58.68; H, 7.29; N, 2.74. Found: C, 58.90; H, 7.26; N, 2.50.

FWH 376: Diethylaminoethyl 3,4,5-trimethoxybenzoate
FWH 411: Ethiodide of diethylaminoethyl 3,4,5-trimethoxybenzoate
FWH 377: Diethylaminopropyl 3,4,5-trimethoxybenzoate
FWH 397: Ethiodide of diethylaminopropyl 3,4,5-trimethoxybenzoate The following Tables II and III give the results in full in blood pressure in the intact anesthetized cat when used at an intravenous dose of 2 mg./kg.:

TABLE II

| Compound (FWH No.) | $LD_{50}IP$ (Mouse, mg./kg.) | Blood Pressure Response mm./Hg. | Duration (min.) |
|---|---|---|---|
| 368 | 190(160–226) | 20 | 1 |
| 400 | 24(23–25) | 60 | 6 |
| 369 | 108(95–124) | 10 | 2 |
| 410 | 13(11–16) | 70 | 15 |
| 370 | 1,500(1,230–1,830) | 26 | 2 |
| 412 | 35(32–38) | 40 | 6 |
| 371 | 205(190–224) | 20 | 3 |
| 399 | 23(22–24) | 40 | 15 |
| 372 | 128(111–147) | 30 | 1 |
| 409 | 14(12–15) | 30 | 4 |
| 376 | 290(258–314) | 14 | 2 |
| 411 | 26(24–28) | 70 | 37 |
| 377 | 160(145–175) | 10 | 3 |
| 397 | 24(21–26) | 50 | 7 |

TABLE III

| Description | Comparison Between | | | | | | |
|---|---|---|---|---|---|---|---|
| | 368 and 400 | 369 and 410 | 370 and 412 | 371 and 399 | 372 and 409 | 376 and 411 | 377 and 397 |
| Increase in Blood Pressure lowering | 3X | 7X | 1.5X | 2X | 0X | 5X | 5X |
| Increase in duration of effect | 6X | 7.5X | 3X | 5X | 4X | 18.5X | 2.5X |

As shown in Tables II and III, the quaternization of the aminoalkyl esters of 3,4,5-trimethoxybenzoate acid to form the quaternary aminoalkyl esters of 3,4,5-trimethoxybenzoate acid of the present invention produces a significant effect on the properties of the compounds. Thus, the blood pressure lowering ability of the compounds when they were quaternized increased by a factor of 1.5 to 7 times, with the duration of the effect lasting for 2.5 to 18.5 times as long.

TABLE I

| Compound | M.P. (° C.) | Formula | Analyses | | | | | |
|---|---|---|---|---|---|---|---|---|
| | | | Calculated | | | Found | | |
| | | | C | H | N | C | H | N |
| FWH 409—Ethiodide of pyrrolidino-propyl 3,4,5-tri-methoxy-benzoate | 206 | $C_{19}H_{30}INO_5$ | 47.60 | 6.31 | 2.92 | 47.90 | 6.37 | 2.82 |
| FWH 400—Ethiodide of piperidino-ethyl 3,4,5-tri-methoxy-benzoate | 164 | $C_{19}H_{30}INO_5$ | 47.00 | 6.31 | 2.92 | 46.86 | 6.36 | 2.69 |
| FWH 410—Ethiodide of piperidino-propyl 3,4,5-tri-methoxy-benzoate | 193 | $C_{20}H_{32}INO_5$ | 48.68 | 6.54 | 2.84 | 48.39 | 6.45 | 2.68 |
| FWH 412—Ethiodide of morpholino-ethyl 3,4,5-tri-methoxy-benzoate | 187 | $C_{18}H_{28}INO_6$ | 44.91 | 5.86 | 2.91 | 43.45 | 6.22 | 3.10 |

The following compounds, which are aminoalkyl esters of trimethoxybenzoic acid, and their quaternized compounds of the present invention, were studied for their effect on blood pressure.

FWH 368: Piperidinoethyl 3,4,5-trimethoxybenzoate
FWH 400: Ethiodide of piperidinoethyl 3,4,5-trimethoxybenzoate
FWH 369: Piperidinopropyl 3,4,5-trimethoxybenzoate
FWH 410: Ethiodide of piperidinopropyl 3,4,5-trimethoxybenzoate
FWH 370: Morpholinoethyl 3,4,5-trimethoxybenzoate
FWH 412: Ethiodide of morpholinoethyl 3,4,5-trimethoxybenzoate
FWH 371: Pyrrolidinoethyl 3,4,5-trimethoxybenzoate
FWH 399: Ethiodide of pyrrolidinoethyl 3,4,5-trimethoxybenzoate
FWH 372: Pyrrolidinopropyl 3,4,5-trimethoxybenzoate
FWH 409: Ethiodide of pyrrolidinopropyl 3,4,5-trimethoxybenzoate In the anesthetized intact normotensive cat, dog and rat, the quaternized compounds of the present invention produce a pronounced fall in arterial blood pressure at doses from 0.25–2 mg./kg. The duration of the fall is dependent upon the dose: the absolute fall with increasing dose is much less effected than is the duration of this effect. No tachyphylaxis was observed. The present compounds are also active by oral administration although higher doses are naturally required.

In the spinal cat or dog (animals in which the spinal cord is separated from the brain at the level of the 1st or 2nd cervical vertebrae) the depressor response of all the quaternized compounds of the present invention is markedly reduced. A small fall in pressure is observed but the dose required to produce this fall is 10–20 times greater than that required in the intact animal.

The quaternized compounds of the present invention antagonize blood pressure rise initiated by occlusion of the carotid artery, and by increased intracerebral pressure. The blood pressure response to stimulation of the cut central end of the vagus nerve was also antagonized.

It has been observed that the quaternized compounds of the present invention inhibit transmission across the superior cervical ganglia. Relaxation of the nictiating membrane of the cat eye was also observed, demonstrating parasympathetic blocking activity. The order of this activity varies from compound to compound and the dose employed. The quaternized compounds of the present invention are, however, not adrenolytic as they do not antagonize the peripheral pressor effect of d,1-epinephrine hydrochloride, or d,1-norepinephrine hydrochloride.

In tests conducted to date it appears that FWH 399 and FWH 411 have the longest duration of action. While it is not desired to be limited to any particular theory, it appears that the compounds of the present invention are active in producing a depressor response of blood pressure largely by a central mechanism. The peripheral parasympathetic blocking activity appears to be of secondary importance and the potency of the activity varies with the compound, but adds to the therapeutic usefulness of the invention.

The quaternized compounds of this invention are also effective in reducing increased blood pressure in experimental animals. In the rat made hypertensive (by the excision of one kidney, constriction of the remaining kidney and given prednisolone-chronic renal hypertensive animal), FWH 411, for example, is effective in producing a fall in arterial blood pressure. Similarly in the acutely hypertensive dog (denervated carotid sinus), FWH 411 and FWH 399 produce a good fall in arterial blood pressure.

In addition, the compounds of the invention are useful as inhibitors of acetylcholine synthesis. Direct evidence of this effect was obtained by incubating minced mouse brain at 37° C. for one hour in eserinized bicarbonate Lock solution, at a pH of 7, and in the presence of carbon dioxide and oxygen. It was found that acetylcholine synthesis was significantly inhibited by the novel compounds of the invention. For example, in the presence of the ethiodide of pyrrolidinoethyl 3,4,5-trimethoxybenzoate (FWH–399), at a concentration of $10^{-5}$ M, the acetylcholine synthesis was approximately 50 percent of control. Similarly, ethyl p-toluene sulfonate of diethylaminoethyl 3,4,5-trimethoxybenzoate (FWH–429), at the above-stated concentration, produced substantial inhibition of the acetylcholine synthesis.

The compounds of the present invention may be formed into a pharmaceutical preparation by admixture with a pharmaceutically acceptable, ingestible carrier.

An example of such a preparation is as follows:

Each tablet contains:

| | Gms. |
|---|---|
| Active ingredient | 0.010 |
| Starch | 0.020 |
| Lactose | 0.165 |
| Magnesium stearate (lubricant 7 mls. granulating solution 10% PVP in isopropyl alcohol for 100 tablets) | 0.005 |

The compounds of the present invention have been demonstrated to produce a fall in systolic and diastolic blood pressure in normotensive humans at oral doses from 10–120 mg. No untoward side effects have been observed with these doses. This demonstrates a lowering effect upon blood pressure in the human species.

We claim:

A quaternized salt of morpholinoethyl 3,4,5-trimethoxybenzoate, said salt being selected from the group consisting of the ethiodide, the ethyl bromide salt and the ethyl p-toluenesulfonate salt.

References Cited

UNITED STATES PATENTS

| | | | |
|---|---|---|---|
| 2,844,621 | 6/1958 | Bernstein | 260—473 |
| 2,907,764 | 10/1959 | Voegtli et al. | 260—268 |
| 3,013,054 | 12/1961 | Richter | 260—473 |
| 3,086,911 | 4/1963 | Brown | 167—65 |
| 3,089,819 | 5/1963 | Short | 167—65 |

ALEX MAZEL, *Primary Examiner.*

J. S. LEVITT, HENRY R. JILES, *Examiners.*

G. D. GOLDBERG, J. TOVAR, *Assistant Examiners.*